United States Patent [19]
Hamilton et al.

[11] Patent Number: 5,675,191
[45] Date of Patent: Oct. 7, 1997

[54] TRANSMISSION BRAKE DISENGAGEMENT APPARATUS FOR IMPROVING THE STARTING CONSISTENCY OF A DRAG RACE CAR

[76] Inventors: William H. Hamilton, 9799 Wayne Ave., Cincinnati, Ohio 45215; Robert E. Furrow, P.O. Box 193A, Rte. 2, Hinton, Okla. 73047

[21] Appl. No.: 634,022

[22] Filed: Apr. 17, 1996

[51] Int. Cl.⁶ .................................................. H01H 43/04
[52] U.S. Cl. ...................................... 307/10.1; 307/141.4
[58] Field of Search .................................... 307/9.1, 10.1, 307/10.3, 10.4, 10.6, 117, 141, 141.4, 141.8, 142; 361/173–176, 194–198, 170; 180/287, 370; 123/179.3, 335, 333

[56] References Cited

U.S. PATENT DOCUMENTS

| Re. 32,474 | 8/1987 | Reid | 307/10.1 |
| 4,467,219 | 8/1984 | Reid | 307/10.1 |
| 4,596,215 | 6/1986 | Palesotti | 123/335 |
| 4,812,671 | 3/1989 | Furrow | 307/10.1 |
| 4,840,157 | 6/1989 | Furrow | |
| 4,873,891 | 10/1989 | Guanciale | |

*Primary Examiner*—Richard T. Elms
*Attorney, Agent, or Firm*—Mark F. Smith

[57] ABSTRACT

A transmission brake disengagement apparatus for mounting on a drag racing car having a transmission brake safety switch and an infrared radiation actuated starting switch for providing an electrical signal to effect the disengagement of an electrically actuated transmission brake of a drag race car.

11 Claims, 3 Drawing Sheets

TRANSMISSION BRAKE DISENGAGEMENT APPARATUS FOR IMPROVING THE STARTING CONSISTENCY OF A DRAG RACE CAR

BACKGROUND OF THE INVENTION

The present invention relates to a transmission brake disengagement apparatus for mounting on a drag race car and more particularly, to a transmission brake disengagement apparatus having an infrared radiation actuated starting switch for providing an electrical signal to effect the disengagement of an electrically actuated transmission brake of a drag race car.

In the sport of drag racing, drivers strive to cover a fixed distance in a preselected time and the difference between winning and losing a race is often measured in thousandth's of a second. Accordingly, the nature of a drag race places importance on the consistency of operation of the mechanisms of the car and the consistency of the reaction time of the driver with the result that getting off to a good start being a matter of great importance to race car drivers.

In typical drag racing, cars may cross the starting line only after the green light or starting light comes on. If the car crosses the starting line prior to the green light, the driver is said to have "red lighted" and automatically loses. Conventional drag race cars are equipped with a transmission brake which comprises a solenoid which when energized holds the car at the starting line thereby allowing the driver to power-up the engine of the car prior to the start of the race and to maintain the engine at or near maximum power until the solenoid is de-energized.

Typically, the start of a drag race is first initiated by a series of yellow lights which are illuminated in sequence with each light being illuminated for five-tenths of a second before the green light appears. Thus, the driver of a drag race car is in a position to judge the time the green light will illuminate and react by releasing a mechanical starting switch to electronically disengage the transmission brake.

In order to improve starting consistency a delay box having a timing circuit was developed that operated to disengage the transmission brake of the car and eliminate the need to estimate the time the green light will illuminate. The circuit included a programmable down counter and a clock which begins a timing sequence when a starting switch is released. Thus, the driver could release the starting switch when the first of a series of yellow lights illuminate and the transmission brake would be disengaged when the counter reached a zero count. Since the driver could allow for his reaction time in setting the counter, the introduction of this circuit theoretically placed him in a position to attain an ideal start.

Unfortunately, a driver's reaction time between races is not consistent. Further, the position of the diver's hand, the hand strength of the driver, the temperature and the amount of use of the mechanical starting switch can all effect the activation time of the starting switch and the consistency of the timing of the start.

Accordingly, a need exist for a transmission brake disengagement apparatus for improving the consistency of activating the timing circuit of a delay box for disengaging the transmission brake of a drag race car which is not adversely effected by the position or strength of the driver's hand or the temperature and the amount of use of the apparatus.

SUMMARY OF THE INVENTION

The present invention is directed to a transmission brake disengagement apparatus which eliminates the disadvantages of transmission brake disengagement apparatus having mechanical switches thereby improving the starting consistency of a drag race car. In particular, the present invention provides an improved transmission brake disengagement apparatus which responds to variations in passive infrared radiation produced as a result of the driver passing his finger between a passive infrared radiation detector and an infrared radiation emitter. The transmission brake disengagement apparatus includes a safety switch for preventing the inadvertent activation of the delay box timing circuit.

A primary object of the invention, therefore, is to provide a transmission brake disengagement apparatus which improves the starting consistency of a drag race car.

Another primary object of the invention is to provide a transmission brake disengagement apparatus which eliminates the disadvantages of mechanical starting switches.

Another primary object of the invention is to provide a transmission brake disengagement apparatus which is not affected with the drivers hand position or physical strength.

Another primary object of the invention is to provide an transmission brake disengagement apparatus which is not affected by temperature variations found in the driver's compartment of a drag race car.

Another primary object of the invention is to provide a transmission brake disengagement apparatus which reacts consistently and relatively instantaneously upon activation by the drag race car driver.

Another primary object of the invention is to provide a transmission brake disengagement apparatus which reduces the risk of inadvertent activation of the delay box timing circuit.

These and other objects and advantages of the invention will be apparent from the following description, the accompanying drawings and the appended claims.

DETAILED DESCRIPTION OF THE PREFERRED EMBODIMENT

Figure 1:
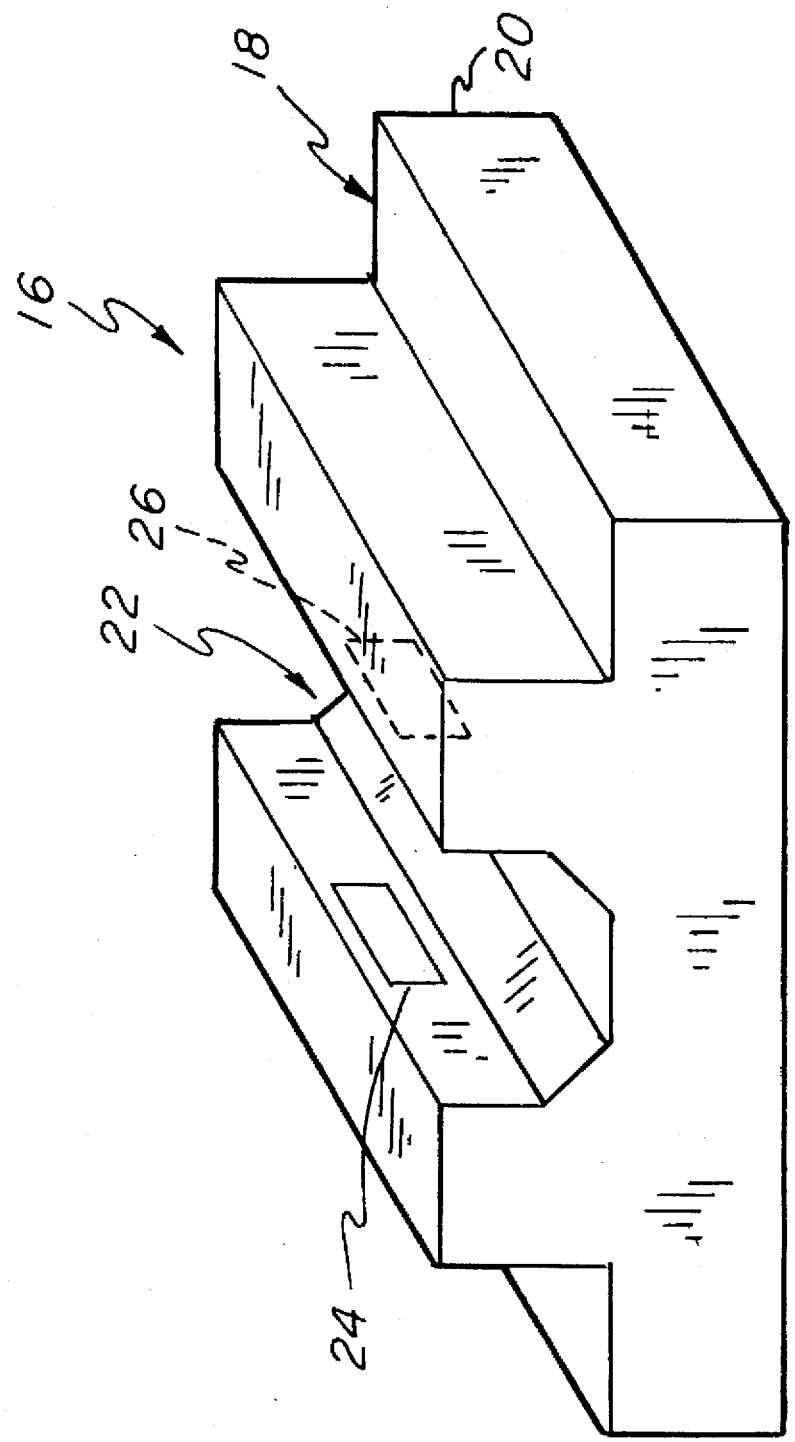
FIG. 1 is a perspective view of a preferred embodiment of the infrared radiation emitter and detector holder of the present invention.
Figure 2:
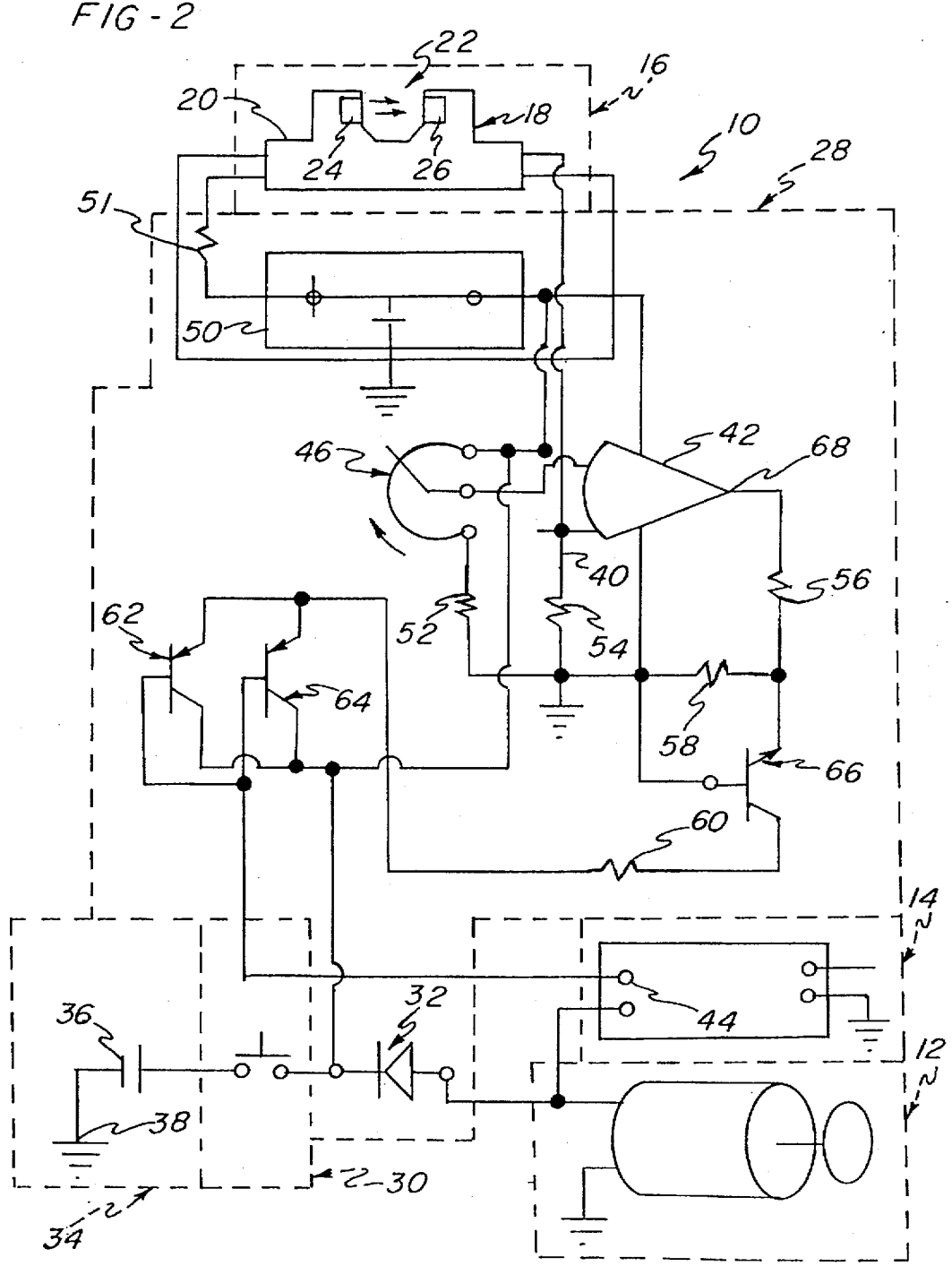
FIG. 2 is a circuit diagram of a portion of the electrical circuit of the a preferred embodiment of the present invention.
Figure 3:
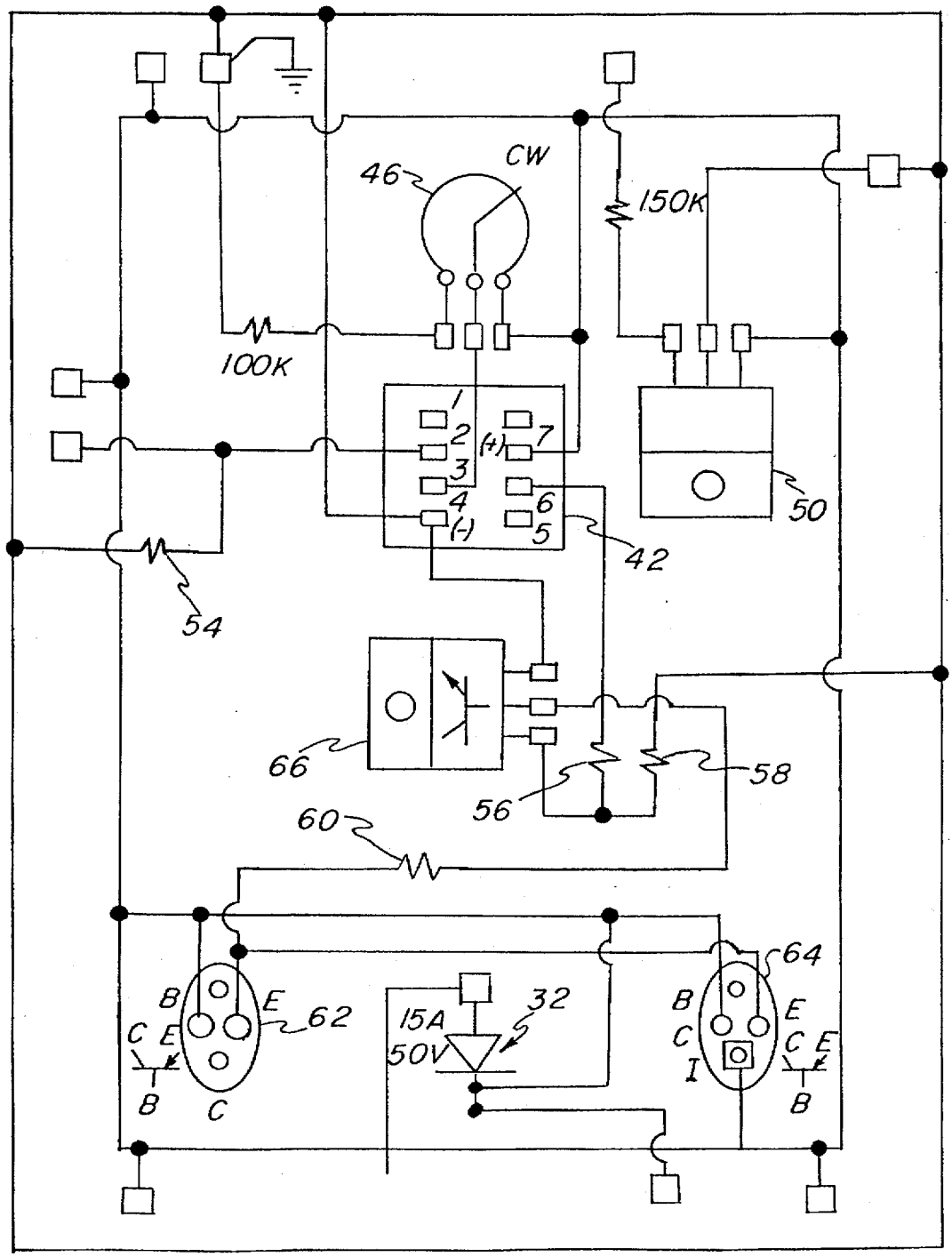
FIG. 3 is a circuit diagram of another portion of the electrical circuit of a preferred embodiment of the transmission brake disengagement apparatus of FIG. 2.

Referring now to the drawings in general, shown therein and designated by the reference number 10 is a schematic diagram of the transmission brake disengagement apparatus constructed in accordance with the present invention. Typically a conventional transmission brake, represented by the box bearing reference numeral 12, includes a solenoid (not shown) and will permit the transmission of the drag race car to be engaged at such times that an electrical current flows through the solenoid and will disengage the transmission at such times that no current flows through the solenoid. A conventional delay box, represented by the box bearing reference numeral 14, containing a timing circuit having an adjustable counter (not shown) for providing precisely controlled time intervals, is conventionally mounted in a convenient location in the drag race car. The transmission brake disengagement apparatus 10 includes a starting switch 16 for interrupting power to the delay box for activating the timing circuit. The starting switch 16 includes an infrared radiation emitter and detector holder 18 having a mounting casing 20 and a finger slot 22, an infrared emitter 24, and an infrared detector 26. The infrared radiation emitter and detector holder 18 may be conventionally mounted on the steering wheel of the drag race car (not shown) to facilitate use of the starting switch 16 by the driver.

The transmission brake disengagement apparatus 10 is comprised of a starting switch 16 for detecting variations in passive infrared radiation produced as a result of the driver passing his finger between the infrared radiation detector 26 and the infrared radiation emitter 24; a power assembly 28 to define, determine, and coordinate the total system into a consistent, safe, and a driver activated transmission brake disengagement apparatus; and a conventional transmission brake safety switch 30 which applies a voltage signal to the delay box 14.

With this general description of the transmission brake disengagement apparatus 10, it will be useful to begin the detailed description of the circuit with the transmission brake safety switch 30 and the starting switch 16 comprising the transmission brake disengagement apparatus 10. The transmission brake safety switch 30 operates to apply a positive 12 volt d.c. signal to the delay box 14. As shown, the line side of the transmission brake safety switch 30 is connected to receive a positive 12 vote d.c. signal. The load or output side of the transmission brake safety switch 30 is connected to the cathode of the power diode 32. The polarity, the anode of power diode 32, being directly connected to the solenoid (not shown) of the delay box 14 prohibits the flow of power to the solenoid. In practice, the positive 12 vote d.c. signal is supplied using a standard car battery 34 with the negative terminal 36 grounded to the race-car chassis (not shown). The chassis ground conductor 38 is the common ground for the complete transmission brake disengagement apparatus 10.

In electrical, especially electronic or solid state control systems, the chassis ground should be connected through the ground conductor 38 at only one point. Preferably, the connection point should be at the location where the negative terminal 36 of the car battery 34 is connected to the car chassis.

The starting switch 16 functions as an electronic fast acting switch. The infrared radiation emitter 26 comprises a light emitting diode (LED) which, when energized, will emit infrared light which is detected by the infrared detector 26. When the detector 26 detects infrared light from the emitter 24, the LED conductor 40, which is the non-inverting input to an operational amplifier 42, charges and inhibits the power assembly 28 from delivering the positive 12 volt d.c. signal to the switch input 44 of the delay box 14. When the detector 26 does not detect infrared radiation from the emitter 24, the LED conductor 40 de-energizes and permits the power assembly 28 to deliver power to the switch input 44 of the delay box 14.

The power assembly 28 is a high gain amplifier which reacts to and co-ordinates the driver's initiated manual actions to produce the energization and de-energization of the transmission brake solenoid. A potentiometer 46 is provided and cooperates with the 150 kilohm resistor 48 and a conventional 5 volt voltage regulator 50, having a current limiting resistor 51 for protecting the LED, in order to null the effects of any leakage of light which may be detected by the detector 26 when the driver's finger is in the slot 22 of holder 18. The power assembly 28 is provided with 100 kilohm resistors 52 and 54, 10 kilohm resistor 56, 4.7 kilohm resistor 58 and 50 ohn resistor 60 to provide the appropriate voltage level for the various inputs into the operational amplifier 42. Two parallel 150 watt PNP transistors 62 and 64 having their bases connected to the switch input 44 of the delay box 14, the transmission brake safety switch 30, and the cathode of the power diode 32 are connected in series to a 65 watt NPN transistor 66 and operate to increase the current to the level necessary for operation of the delay box timing switch and/or for activation of the solenoid of the transmission brake. When the potentiometer 46 is properly adjusted to impose or set a zero output voltage between the output conductor 68 of the operational amplifier 42 and the chassis ground conductor 38, the resistors (52, 54, 56, 58, and 60) and transistors (62, 64, and 68) outputs operate to provide no power to the delay box 14. It should be apparent to one skilled in the art that the transistors are capable of carrying the full-load required by the transmission brake solenoid if the delay box is not used or if the delay box bypass is selected.

In operation, after adjustment of the potentiometer 46 to null the effects of any leakage of light which may be detected by the detector 26, the driver places his finger into the slot 22 of the infrared radiation emitter and detector holder 18 and then momentarily depresses the transmission brake safety switch 30. When the transmission brake safety switch 30 is depressed power will be supplied to the switch input 44 of the delay box 14 and will energize the solenoid. When the driver receives the signal to commence the race, he removes his finger from the slot 22, power to the switch input 44 of the delay box 4 is disrupted thereby activating the timing circuit in the delay box. After the counter of the timing circuit reaches the preselected time interval, power will be disrupted from the transmission brake solenoid thereby releasing the brake and allowing the car to accelerate rapidly from stop at the very instant the green light appears.

From the foregoing, It should be apparent to one skilled in the art that the transmission brake disengagement apparatus 10 has a number of advantages. If the driver inadvertently places his finger into the slot 22 of the starting switch 16, nothing will happen since the power from the car battery 34 is not provided to the power assembly 28. Further, the components comprising the power assembly and their connecting conductors are power rated and are capable of handling and supplying at least 12 amps of direct current which is required when a delay box 14 is not in use or set for bypass. Further, design of the power assembly 28 operates to take out the AC "bite" out of the solenoid when it is released caused by the alternate current effect when power is released.

Accordingly, the subject invention is a safe and consistent transmission brake disengagement assembly which eliminates the disadvantages of transmission brake disengagement assemblies having mechanical switches, is not affected with the drivers hand position or physical strength, is not effected by temperature variations found in the driver's compartment of a drag race car, which consistently and relatively instantaneously reacts upon activation by the drag race car driver, and which reduces the risk of inadvertent activation of the transmission brake timing circuit. Further, it should also be apparent to one skilled in the art that a second transmission brake disengagement assembly may be used to activate a second counter in the transmission brake timing circuit thereby allowing the driver to reject his first timing light and select a second timed start. It should also be apparent to one skilled in the art that the delay box may be programmed to select the best of the two starting signals for activating the timing circuit.

Although this invention has been shown and described with respect to detailed embodiments thereof, it will be understood by those skilled in the art that various changes in form and detail thereof may be made without departing from the spirit and scope of the claimed invention.

What is claimed is:

1. A transmission brake disengagement apparatus for use in a drag race car having an electric power source and an electrically actuated transmission brake, said transmission brake disengagement apparatus comprising an electronic switch means electrically connected to the transmission brake and the electric power source such that power is provided to the transmission brake when said electronic switch means is actuated and said power is interrupted when said electronic switch means is deactuated, wherein said electronic switch means comprises an infrared radiation actuated starting switch.

2. The transmission brake disengagement apparatus of claim 1, further comprising a potentiometer for nulling the effects of any leakage of light being detected by said infrared radiation actuated starting switch when said electronic switch means is actuated.

3. A transmission brake disengagement apparatus for use by a driver of a drag race car having an electric power source and an electrically actuated transmission brake, said transmission brake disengagement apparatus comprising a transmission brake safety switch and an infrared radiation actuated starting switch for providing an electrical signal to effect the disengagement of the transmission brake, said starting switch comprising an infrared radiation emitter, an infrared radiation detector, and a finger slot therebetween for receiving the finger of the driver to actuate said infrared radiation actuated starting switch and to deactuate said infrared radiation actuated starting switch as a result of the driver removing his finger from said finger slot, said transmission brake safety switch and said starting switch are electrically connected to the electric power source such that power is provided to the transmission brake when said infrared radiation actuated starting switch is actuated and said power is interrupted when said infrared radiation actuated starting switch is deactuated.

4. The transmission brake disengagement apparatus of claim 3, further comprising a high gain amplifier electrically connected to said infrared radiation actuated starting switch and the transmission brake such that said high gain amplifier reacts to the driver's manual actions to send said electrical signal to actuate and deactuate the transmission brake.

5. The transmission brake disengagement apparatus of claim 3, further comprising a potentiometer for nulling the effects of any leakage of light being detected by said infrared radiation detector when said starting switch is deactuated.

6. The transmission brake disengagement apparatus of claim 3, further comprising a power assembly and an operational amplifier, said power assembly comprising resistor means for providing the appropriate voltage level to the operational amplifier.

7. The transmission brake disengagement apparatus of claim 3, wherein said transmission brake disengagement apparatus is electrically connected to a delay box having a timing circuit with an adjustable counter for providing precisely controlled time intervals.

8. The transmission brake disengagement apparatus of claim 7 further comprising a second infrared radiation actuated starting switch for providing a second electrical signal to the delay box.

9. A transmission brake disengagement apparatus for use by a driver of a drag race car having an electric power source, an electronic delay box having a timing circuit, and an electrically actuated transmission brake, said transmission brake disengagement apparatus comprising a transmission brake safety switch and a starting switch, said starting switch having means for mounting to the drag race car, an infrared radiation emitter, an infrared radiation detector, and a finger slot therebetween for receiving the finger of the driver to actuate said starting switch and to deactuate said starting switch as a result of the driver passing his finger through said finger slot, said transmission brake safety switch and said starting switch are electrically connected to the delay box and the electric power source for interrupting power from the delay box when said transmission brake safety switch is actuated and said starting switch is deactuated.

10. The transmission brake disengagement apparatus of claim 9 further comprising a second infrared radiation actuated starting switch for providing a second electrical signal to the delay box.

11. The transmission brake disengagement apparatus of claim 9 further comprising a potentiometer electrically connected to said starting switch for nulling the effects of any leakage of light being detected by said infrared radiation detector when said starting switch is deactuated.

* * * * *